(12) United States Patent
Schallig et al.

(10) Patent No.: US 8,757,050 B2
(45) Date of Patent: Jun. 24, 2014

(54) HOT BEVERAGE MAKING DEVICE COMPRISING A BOILER AND CONNECTING MEANS FOR CONNECTING THE BOILER TO A HOUSING OF THE DEVICE

(75) Inventors: Michiel Allan Aurelius Schallig, Drachten (NL); Meindert Gorter, Drachten (NL)

(73) Assignee: Koninklijke Philips N.V., Eindhoven (NL)

( * ) Notice: Subject to any disclaimer, the term of this patent is extended or adjusted under 35 U.S.C. 154(b) by 1338 days.

(21) Appl. No.: 11/579,678

(22) PCT Filed: May 9, 2005

(86) PCT No.: PCT/IB2005/051493
§ 371 (c)(1),
(2), (4) Date: Nov. 6, 2006

(87) PCT Pub. No.: WO2005/107542
PCT Pub. Date: Nov. 17, 2005

(65) Prior Publication Data
US 2008/0028949 A1 Feb. 7, 2008

(30) Foreign Application Priority Data
May 12, 2004 (EP) .................................... 04102050

(51) Int. Cl.
*A23F 3/00* (2006.01)
*A47J 31/54* (2006.01)

(52) U.S. Cl.
CPC ...................................... *A47J 31/54* (2013.01)
USPC ........... 99/323.3; 126/30; 126/50; 126/363.1; 126/271.1; 126/271.2 R; 126/400; 126/376.1; 126/375.1; 126/569; 126/626; 99/275

(58) Field of Classification Search
CPC ....................................................... A47J 31/54
USPC ................. 99/275, 323.3; 126/30, 50, 363.1, 126/271.1, 271.2 R, 400, 376.1, 375.1, 569, 126/626; 248/339, 610, 612, 692; 165/50; 392/311, 325, 449
See application file for complete search history.

(56) References Cited

U.S. PATENT DOCUMENTS

| | | | | |
|---|---|---|---|---|
| 361,461 | A * | 4/1887 | Smith | 248/95 |
| 690,150 | A * | 12/1901 | Inman | 254/131 |
| 1,757,343 | A * | 5/1930 | Steinmuller | 122/510 |
| 2,193,392 | A * | 3/1940 | Coltman | 99/323.6 |

(Continued)

FOREIGN PATENT DOCUMENTS

| | | |
|---|---|---|
| DE | 31 37 688 | 4/1983 |
| DE | 37 41 922 | 6/1989 |
| FR | 2560729 A * | 9/1985 |

*Primary Examiner* — Dana Ross
*Assistant Examiner* — Brett Spurlock

(57) ABSTRACT

A hot beverage making device includes a boiler for heating water; a housing for accommodating the boiler and connecting element for connecting the boiler to the housing. During operation of the boiler, water is heated and water vapor bubbles are created inside the boiler. Formation of the bubbles causes varying moments about the center of mass of the boiler. The connecting element is adapted to prevent transmittal to the housing of at least a portion of the moment variations. This keeps the noise produced as a result of vibrations of the housing at an acceptable level. In particular, the connecting element is adapted to let the boiler have at least one rotational degree of freedom.

8 Claims, 3 Drawing Sheets

(56) References Cited

U.S. PATENT DOCUMENTS

Figure 1:
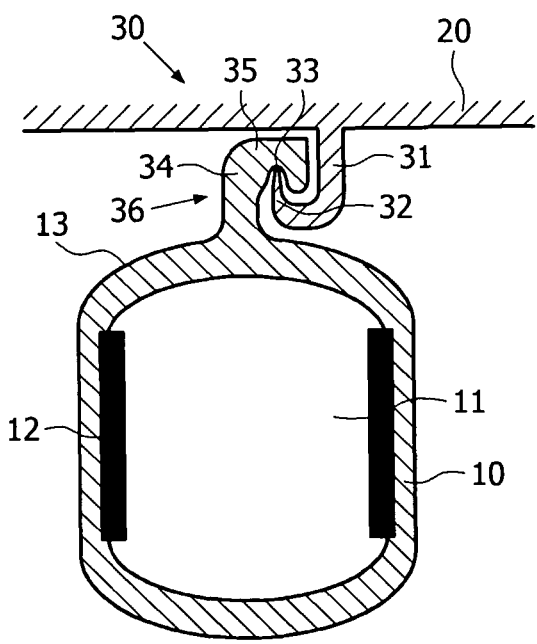

| | | | | |
|---|---|---|---|---|
| 2,268,495 A * | 12/1941 | Petty | | 73/866.1 |
| 2,304,547 A * | 12/1942 | Cutter | | 248/692 |
| 3,031,559 A * | 4/1962 | Harmon et al. | | 392/451 |
| 3,139,882 A * | 7/1964 | White | | 126/506 |
| 3,187,937 A * | 6/1965 | Berta | | 220/751 |
| 3,344,733 A * | 10/1967 | Herrera | | 99/302 R |
| 3,952,644 A * | 4/1976 | Wales | | 99/419 |
| 4,043,260 A * | 8/1977 | LaPour et al. | | 99/421 HH |
| 4,074,621 A * | 2/1978 | Cailliot | | 99/286 |
| 4,464,982 A * | 8/1984 | Leuschner et al. | | 99/287 |
| 4,513,936 A * | 4/1985 | Goulter | | 248/122.1 |
| 4,520,793 A * | 6/1985 | Hall | | 126/626 |
| 4,551,613 A * | 11/1985 | Yashfe | | 392/451 |
| 5,064,981 A * | 11/1991 | Bolton | | 219/752 |
| 5,329,917 A * | 7/1994 | Young | | 126/29 |
| 5,368,270 A * | 11/1994 | Wiwczar | | 248/610 |
| 5,379,981 A * | 1/1995 | Leiderer | | 248/550 |
| 5,507,275 A * | 4/1996 | Clark | | 126/627 |
| 5,586,492 A * | 12/1996 | Graef | | 99/516 |
| 5,712,038 A * | 1/1998 | Yamazaki et al. | | 428/411.1 |
| 5,762,762 A * | 6/1998 | Breithaupt et al. | | 202/185.3 |
| 5,799,567 A * | 9/1998 | Dorner | | 99/348 |
| 5,944,009 A * | 8/1999 | Scheller | | 126/30 |
| 6,098,526 A * | 8/2000 | Stein et al. | | 99/323.9 |
| 6,158,315 A * | 12/2000 | Nowotny et al. | | 83/23 |
| 6,227,102 B1 * | 5/2001 | Sham et al. | | 99/286 |
| 6,327,967 B1 * | 12/2001 | Pei | | 99/339 |
| 6,367,370 B1 * | 4/2002 | Sham et al. | | 99/286 |
| 6,389,957 B1 * | 5/2002 | Sham et al. | | 99/286 |

* cited by examiner

HOT BEVERAGE MAKING DEVICE COMPRISING A BOILER AND CONNECTING MEANS FOR CONNECTING THE BOILER TO A HOUSING OF THE DEVICE

The present invention relates to a device for making a hot beverage such as coffee or tea, comprising:

a boiler for heating water;

a housing for accommodating the boiler and other components of the device; and connecting means for connecting the boiler to the housing.

Many embodiments of such a device are known in practice. For example, a device for making coffee is known, which comprises a brew chamber in which the coffee is actually made. In case a user desires to obtain a quantity of coffee, he places a coffee pad comprising an envelope filled with a quantity of ground coffee beans in the brew chamber. During operation of the coffee maker, a quantity of water is forced to flow through the coffee pad. In the process, the envelope acts as a filter. In this way, on the basis of the interaction between the pressurized water and the coffee pad inside the brew chamber, the desired quantity of coffee is obtained.

For the purpose of heating the water to a predetermined temperature, usually about 95° C., the coffee maker comprises a boiler having a container for containing the water and heating means for heating the water. For the purpose of pressurizing the water, the coffee maker comprises a pump. The pump, the boiler and the brew chamber are interconnected by means of tubes for transporting water.

In practice, during the process of making coffee, the coffee maker appears to produce a lot of noise during the time the boiler is employed to heat the water. The noise appears to be caused by vibrations of the housing of the coffee maker. It is an objective of the present invention to provide a coffee maker having a new design, wherein the level of produced noise during operation of the boiler of the coffee maker having the new design is lower than the level of produced noise during operation of the boiler of the known coffee maker. The objective is achieved by altering the design of the connecting means for connecting the boiler to the housing, in such a way that connecting means which are adapted to preventing transmittal to the housing of at least a portion of moment variations associated with operation of the boiler are obtained.

According to an important insight underlying the present invention, in the known coffee maker, the vibrations of the housing are obtained as a result of the following chain of events, which is related to operation of the boiler:

as a result of the heating process, water vapor bubbles are created inside the boiler;

as a result of the bubble creation, the center of mass of the boiler is instantly displaced and varying moments about the center of mass are obtained;

the moment variations are transmitted to the housing, through the connecting means by which the boiler is connected to the housing.

In the known coffee maker, the boiler is fixedly attached to the housing, and this fact appears to play an important role in the process of obtaining vibrations of the housing during operation of the boiler. Since the connecting means are fixedly attached to both the boiler and the housing, the moment variations which are present at a boiler side of the connecting means during operation of the boiler are transmitted to a housing side of the connecting means. At the housing side of the connecting means, the moment variations are transmitted to the housing and give rise to vibrations of the housing.

According to the present invention, the coffee maker is provided with connecting means which are adapted to preventing transmittal to the housing of at least a portion of moment variations associated with operation of the boiler. As a consequence of the application of these connecting means, the vibrations of the housing are substantially reduced, and the same is true for the level of the produced noise.

Preferably, the connecting means are adapted to letting the boiler have at least one rotational degree of freedom, so that, during operation of the boiler, at least a portion of the moment variations actually causes the boiler to tilt, wherein transmittal of these moment variations to the housing does not take place. It will be understood that, in general, the level of produced noise is less reduced in case the boiler has only one rotational degree of freedom than in case the boiler has all three possible rotational degrees of freedom.

Within the scope of the present invention, many practical embodiments are conceivable. For example, the connecting means may comprise two parts, wherein one part rests on another part without being fixed to that other part. It is also possible that the connecting means comprise at least one flexible member such as a rubber ring, a rubber strip or a rubber wire.

Figure 2:
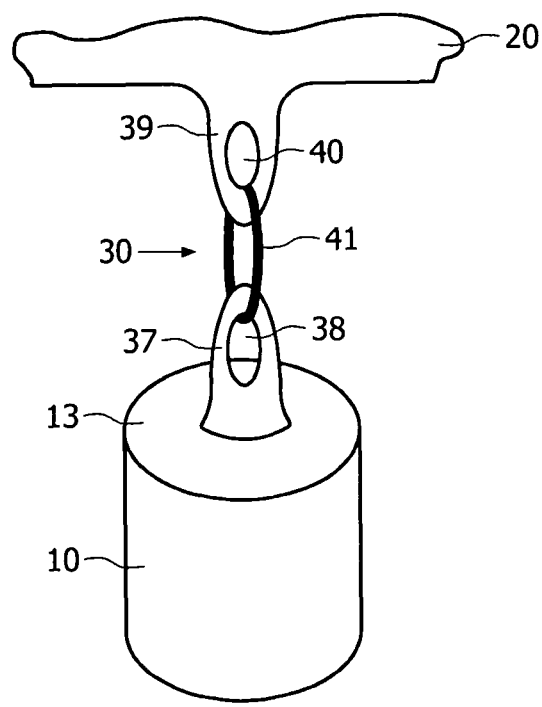
Figure 3:
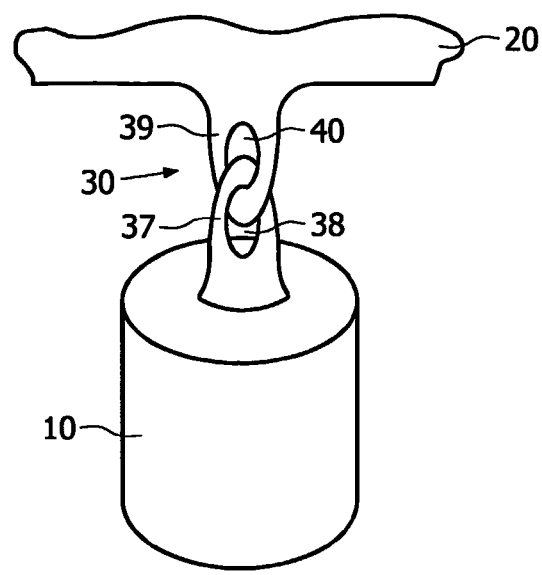
Figure 4:
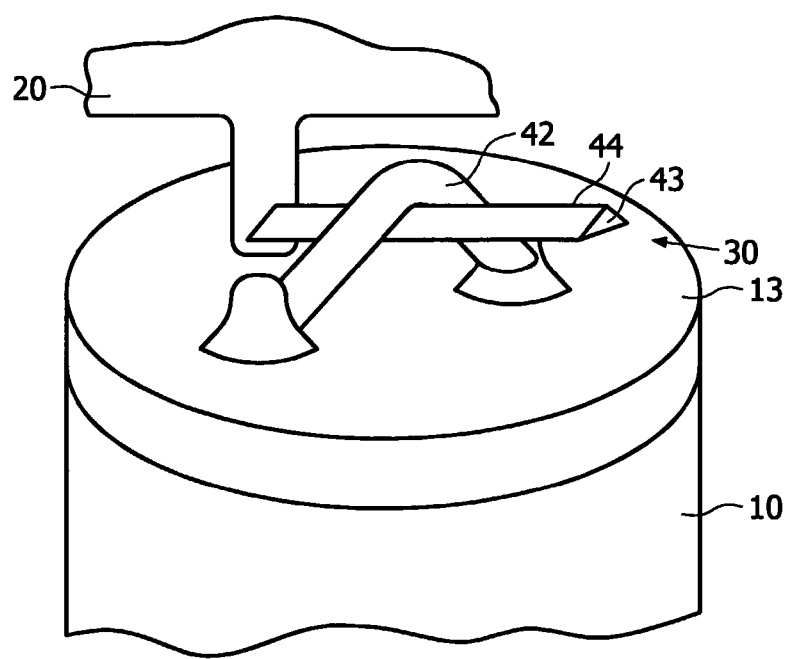
Figure 5:
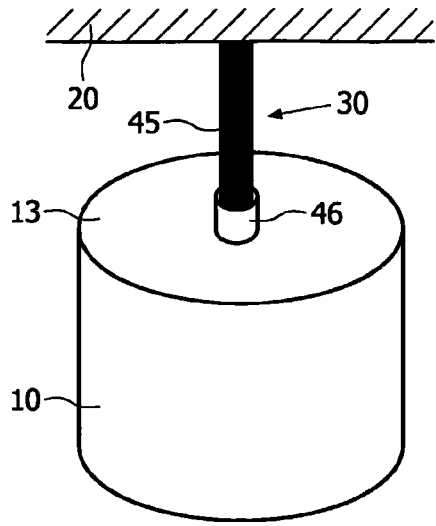
Figure 6:
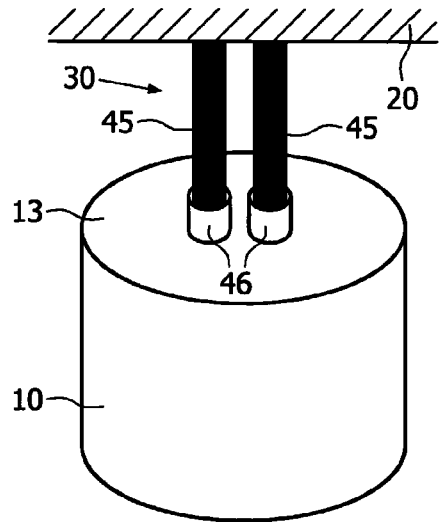
Figure 7:
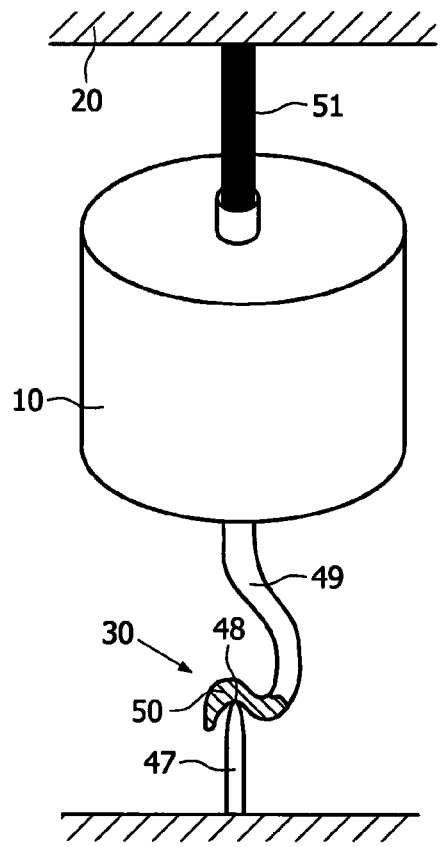

The present invention will now be explained in greater detail with reference to the figures, in which:

FIG. 1 diagrammatically shows a section of boiler and a portion of a housing of a beverage making device, wherein the boiler is connected to the housing by connecting means according to a first preferred embodiment of the present invention;

FIG. 2 diagrammatically shows a boiler and a portion of a housing of a beverage making device, wherein the boiler is connected to the housing by connecting means according to a second preferred embodiment of the present invention;

FIG. 3 diagrammatically shows a boiler and a portion of a housing of a beverage making device, wherein the boiler is connected to the housing by connecting means according to a third preferred embodiment of the present invention;

FIG. 4 diagrammatically shows a portion of a boiler and a portion of a housing of a beverage making device, wherein the boiler is connected to the housing by connecting means according to a fourth preferred embodiment of the present invention;

FIG. 5 diagrammatically shows a boiler and a portion of a housing of a beverage making device, wherein the boiler is connected to the housing by connecting means according to a fifth preferred embodiment of the present invention;

FIG. 6 shows a boiler and a portion of a housing of a beverage making device, wherein the boiler is connected to the housing by connecting means according to a sixth preferred embodiment of the present invention; and FIG. 7 shows a boiler and a portion of a housing of a beverage making device, wherein the boiler is connected to the housing by connecting means according to a seventh preferred embodiment of the present invention.

FIGS. 1-7 diagrammatically show a boiler 10 or a portion of a boiler 10 of a device for making a hot beverage such as coffee or tea. The boiler 10 serves for heating water, and comprises a container 11 for containing water and heating means 12 for supplying heat to the water, as shown in FIG. 1.

Besides the boiler 10 or a portion of the boiler 10, FIGS. 1-7 also diagrammatically show a portion of a housing 20 of the hot beverage making device. The housing 20 serves for accommodating the boiler 10 and other components (not shown) of the device. The boiler 10 is connected to the housing 20 by means of connecting means 30.

In particular, the present invention relates to the connecting means 30. Therefore, the exact shape of the housing 20 is not essential. Furthermore, the boiler 10 may be any suitable boiler. In the figures, for the sake of simplicity, the boiler 10 is depicted as a closed cylinder, and details such as a water inlet and a water outlet of the boiler 10 are not shown.

FIG. 1 shows a configuration in which the boiler 10 is located underneath a portion of the housing 20 to which it is connected. The housing 20 comprises a hook 31 having a free end portion 32 extending in an upward direction, i.e. an outer point 33 of the end portion 32 constitutes the highest point of the end portion 32. At a top surface 13 of the boiler 10, a bent connecting arm 34 is arranged. In a free end portion 35 of the connecting arm 34, a recess 36 is provided, which is open at the side of the boiler 10.

The boiler 10 is connected to the housing 20 through an engagement of the end portion 35 of the connecting arm 34 with the hook 31, wherein the outer point 33 of the end portion 32 of the hook 31 is accommodated by the recess 36 in the free end portion 35 of the connecting arm 34. Consequently, contact between the boiler 10 and the housing 20 is only established over the outer point 33 of the end portion 32 of the hook 31.

In the shown configuration, the boiler 10 is free to change angle about three perpendicular rotation axes, in other words, the boiler 10 has all three rotational degrees of freedom. During operation of the boiler 10, when the heating means 12 are activated and vapor bubbles are formed in the water, the moment variations caused by the influence of the vapor bubbles on the position of the center of mass of the boiler 10 result in movements of the boiler 10 about the point where the end portion 35 of the connecting arm 34 contacts the outer point 33 of the end portion 32 of the hook 31, in all possible rotational directions. As an advantageous result, the moment variations are not transmitted to the housing 20, so that a situation in which the housing 20 vibrates under the influence of the moment variations taking place in the boiler 10 is avoided. Due to this, the level of noise associated with operation of the boiler 10 is relatively low.

FIG. 2 also shows a configuration in which the boiler 10 is located underneath a portion of the housing 20 to which it is connected. At the top surface 13 of the boiler 10, a connecting member 37 having an opening 38 is arranged. The housing 20 also comprises a connecting member 39 having an opening 40. The connecting members 37, 39 are interconnected by means of a connecting ring 41, which extends through the openings 38, 40 in both connecting members 37, 39. Preferably, the connecting ring 41 comprises a flexible material such as rubber.

The connecting ring 41 may be omitted, and the connecting member 37 of the boiler 10 may be directly connected to the connecting member 39 of the housing 20. In that case, which is shown in FIG. 3, a portion of the connecting member 37 of the boiler 10 extends through the opening 40 in the connecting member 39 of the housing 20, whereas a portion of the connecting member 39 of the housing 20 extends through the opening 38 in the connecting member 37 of the boiler 10.

In the configurations as shown in FIGS. 2 and 3, the boiler 10 has a lot of freedom to perform rotational movements in reaction to the moment variations which occur during operation of the boiler 10. Therefore, in these configurations, a substantial portion of the moment variations result in movements of the boiler 10, and are not transmitted to the housing 20.

Like FIGS. 1-3, FIG. 4 shows a configuration in which the boiler 10 is located underneath a portion of the housing 20 to which it is connected. At the top surface 13 of the boiler 10, a suspension string 42 is arranged, of which both ends are connected to the top surface 13. Preferably, the suspension string 42 comprises a flexible material such as rubber. The suspension string 42 is supported by a supporting rod 43 extending from the housing 20 in a substantially horizontal direction.

Preferably, as shown in FIG. 4, a transverse section of the supporting rod 43 has a triangular shape, wherein a base of the triangle is down and a top of the triangle is up. In this way, a relatively sharp upper edge 44 of the supporting rod 43 is obtained, and the area of contact between the suspension string 42 of the boiler 10 and the supporting rod 43 is minimized, so that the freedom of the boiler 10 to move is optimized. Optimal freedom of movement of the boiler 10 provides for a minimization of the moment variations transmitted to the housing 20 during operation of the boiler 10, and consequently for a minimization of vibrations of the housing 20 and produced noise.

The supporting rod 43 may be rigidly connected to the housing 20, but it is for example also possible that the housing 20 is provided with an opening and that an end of the supporting rod 43 is inserted in the opening, wherein a rubber ring or the like is positioned between the end of the supporting rod 43 and the surrounding portion of the housing 20. In the latter case, the rubber ring plays an additional role in preventing vibrations of the housing 20.

It will be understood that the configuration having a suspension string 42 and a supporting rod 43 may be designed in a different fashion than the above-described configuration. The supporting rod 43 may be attached to the boiler 10, and the suspension string 42 may be attached to the housing 20, wherein the supporting rod 43 rests on the suspension string 42.

In FIGS. 5 and 6, a configuration in which the boiler 10 is suspended from the housing 20 is shown. In the configuration as shown in FIG. 5, one suspension string 45 extending between the boiler 10 and the housing 20 is applied. In the configuration as shown in FIG. 6, two of such suspension strings 45 are applied. Preferably, the suspension strings 45 comprise a flexible material such as rubber. The connection between the suspensions strings 45 and the boiler 10 may be realized in any suitable way. The same is true for the connection between the suspensions strings 45 and the housing 20.

In the configurations as shown in FIGS. 5 and 6, the boiler 10 has a lot of freedom to perform rotational movements with respect to the housing 20. Both configurations have all three rotational degrees of freedom, however, in the configuration having one suspension string 45, as shown in FIG. 5, the boiler 10 has more freedom to rotate about its longitudinal axis than in the configuration having two suspension strings 45, as shown in FIG. 6. An advantage of the latter configuration is that a more secure connection between the boiler 10 and the housing 20 is obtained.

In the shown examples, the suspension string 45 is connected to the boiler 10 by means of a receiving member 46 arranged on the top surface 13 of the boiler 10. The suspension string 45 may be rigidly connected to both the boiler 10 and the housing 20. However, at least in the configuration having one suspension string 45, it is also possible that the connection between the suspension string 45 and at least one of the boiler 10 and the housing 20 is such that any angular displacement between the suspension string 45 and at least one of the boiler 10 and the housing 20 in a plane perpendicular to the longitudinal axis of the suspension string 45 is allowed. For example, the receiving member 46 may be rotatably arranged with respect to the top surface 13 of the boiler 10.

In FIG. 7, a configuration is shown in which not only a top side, but also a bottom side of the boiler 10 is connected to the housing 20. Hence, the boiler 10 does not only hang from the housing 20, but is also supported by the housing 20.

For the purpose of supporting the boiler 10, the housing 20 comprises a pin 47, which, in the shown example, extends in a substantially vertical direction. The boiler 10 rests on a relatively sharp point 48 of the pin 47, through a supporting arm 49 extending from a bottom surface of the boiler 10. Consequently, at the bottom side of the boiler 10, contact between the boiler 10 and the housing 20 is only established over the point 48 of the pin 47. In FIG. 7, for the sake of clarity, an end portion 50 of the supporting arm 49, which surrounds a top portion of the pin 47, is shown in sectional view.

In order to prevent the boiler 10 from falling to the side, the boiler 10 is also connected to the housing 20 at its upper side. This connection may be realized by means of a simple and relatively weak rubber string 51, for example, whereby rotational movements of the boiler 10 are not hindered.

In the configuration shown in FIG. 7, like in the configurations described on the basis of FIGS. 1-6, a minimum of vibrations of the housing 20 during operation of the boiler 10 is obtained, because the connections between the boiler 10 and the housing 20 are such that the boiler 10 is allowed to freely perform most, if not all, possible rotational movements caused by moment variations which occur during operation of the boiler 10. The connections between the boiler 10 and the housing 20 are designed such as to prevent the transmittal to the housing 20 of moment variations caused by the formation of bubbles inside the boiler 10.

It will be clear to a person skilled in the art that the scope of the present invention is not limited to the examples discussed in the foregoing, but that several amendments and modifications thereof are possible without deviating from the scope of the present invention as defined in the attached claims.

Besides the examples shown in FIGS. 1-7, many more constructions are possible within the scope of the present invention. An important aspect of such constructions is that the boiler 10 is not rigidly connected to the housing 20, wherein the connection is such that a movement of the boiler 10 in at least one rotational direction is allowed. By means of this measure, transmittal to the housing 20 of at least a portion of moment variations associated with operation of the boiler 10 is prevented, so that vibrations of the housing 20 and the associated noise are reduced with respect to situations in which no measures are taken to restrict the transmittal of moment variations.

The present invention may be implemented by adapting the connecting means 30 such as to let the boiler 10 have at least one rotational degree of freedom. In a preferred embodiment, the connecting means 30 are adapted to letting the boiler 10 have at least two rotational degrees of freedom. In an even more preferred embodiment, the connecting means 30 are adapted to letting the boiler 10 have all three rotational degrees of freedom.

The invention claimed is:

1. A device for making a hot beverage, said device comprising:
    a boiler for heating water, the boiler including a heater in contact with the water in the boiler for heating the water;
    a housing for accommodating the boiler; and
    a connecting element configured to connect the boiler to the housing, said connecting element being further configured to prevent vibration of the housing due to operation of the boiler,
    wherein the connecting element connects the boiler to the housing in only a single connection point,
    wherein the connecting element comprises a suspension string having two ends, and a supporting rod, both ends of the suspension string being attached to one of the boiler and the housing, and the supporting rod being attached to another one of the boiler and the housing, respectively, the suspension string and the supporting rod engaging each other without being fixed to each other, and
    wherein the supporting rod has a triangular cross section with two edges forming the single connection point where the supporting rod contacts the suspension string.

2. The device as claimed in claim 1, wherein the connecting element comprises at least one flexible element.

3. The device as claimed in claim 1, wherein the connecting element enables the boiler to hang from the housing.

4. The device as claimed in claim 3, wherein the connecting element comprises at least one suspension string.

5. The device as claimed in claim 3, wherein the connecting element comprises connecting members, each having an opening, provided on both the boiler and the housing, and a connecting ring extending through the openings in both connecting members for interconnecting the connecting members.

6. The device as claimed in claim 3, wherein the connecting element comprises connecting members, each having an opening, provided on both the boiler and the housing, a portion of the connecting member of the boiler extending through the opening in the connecting member of the housing, and a portion of the connecting member of the housing extending through the opening in the connecting member of the boiler.

7. The device as claimed in claim 1, wherein the connecting element is further configured to letting the boiler have at least one rotational degree of freedom.

8. The device of claim 1, wherein the supporting rod is rigidly connected to the housing.

* * * * *